US012784320B2

(12) United States Patent
Arimura Tokairin et al.

(10) Patent No.: US 12,784,320 B2
(45) Date of Patent: Nov. 3, 2026

(54) WEARABLE DISPLAY DEVICE, INFORMATION PROCESSING DEVICE, AND IMAGE PRESENTATION METHOD

(71) Applicant: KYOCERA Corporation, Kyoto (JP)

(72) Inventors: Shiori Arimura Tokairin, Yokohama (JP); Hideyuki Kimpara, Yokohama (JP); Martin Klinkigt, Tokyo (JP); Naoki Nishida, Yokohama (JP); Osamu Hoshuyama, Kawasaki (JP); Masayuki Kishi, Hiratsuka (JP); Edwardo Arata Yamamoto Murakami, Sakai (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 19/150,070

(22) PCT Filed: Jan. 29, 2024

(86) PCT No.: PCT/JP2024/002702

§ 371 (c)(1),
(2) Date: Jul. 22, 2025

(87) PCT Pub. No.: WO2024/162276

PCT Pub. Date: Aug. 8, 2024

(65) Prior Publication Data

US 2026/0045019 A1 Feb. 12, 2026

(30) Foreign Application Priority Data

Jan. 31, 2023 (JP) ................................ 2023-013419

(51) Int. Cl.
*G06T 13/40* (2011.01)
*G06F 3/01* (2006.01)
(Continued)

(52) U.S. Cl.
CPC .............. *G06T 13/40* (2013.01); *G06F 3/012* (2013.01); *G06T 17/00* (2013.01); *G06T 19/006* (2013.01); *G06V 20/20* (2022.01)

(58) Field of Classification Search
CPC ....... G06T 19/006; G06T 13/40; G06T 17/00; G06F 3/012; G06F 3/011; G06V 20/20
See application file for complete search history.

(56) References Cited

U.S. PATENT DOCUMENTS 10,796,489 B1 10/2020 Cordes et al.
2017/0061817 A1* 3/2017 Mettler May ........ G09B 19/003
(Continued)

FOREIGN PATENT DOCUMENTS

JP 2019-040356 A 3/2019
JP 2020-201183 A 12/2020

*Primary Examiner* — Muhammad N Edun
(74) *Attorney, Agent, or Firm* — Studebaker Brackett PLLC

(57) ABSTRACT

A wearable display device includes a controller and a display. The controller acquires, based on output values acquired from a plurality of motion sensors, a three-dimensional movement model of body movements of a person. The person wears the plurality of motion sensors. The controller generates a reproduced moving image that shows the three-dimensional movement model viewed in any direction. The display allows the wearer to visually perceive the reproduced moving image along with a surrounding scene.

15 Claims, 7 Drawing Sheets

(51) Int. Cl.

| | |
|---|---|
| ***G06T 17/00*** | (2006.01) |
| ***G06T 19/00*** | (2011.01) |
| ***G06V 20/20*** | (2022.01) |

(56) References Cited

U.S. PATENT DOCUMENTS

| | | | | |
|---|---|---|---|---|
| 2017/0197142 | A1* | 7/2017 | Stafford .................. | G06F 3/014 |
| 2021/0311546 | A1* | 10/2021 | Kodama ................. | G06F 3/011 |
| 2024/0160285 | A1* | 5/2024 | Muhammad ............ | G06F 3/014 |

* cited by examiner

WEARABLE DISPLAY DEVICE, INFORMATION PROCESSING DEVICE, AND IMAGE PRESENTATION METHOD

CROSS-REFERENCE TO RELATED APPLICATIONS

This application claims priority from Japanese Patent Application No. 2023-13419 filed in Japan on Jan. 31, 2023, the entire disclosure of which is incorporated herein by reference.

TECHNICAL FIELD

The present disclosure relates to a wearable display device, an information processing device, and an image presentation method.

BACKGROUND OF INVENTION

Providing useful information by analyzing any action of a user is demanded. For analyzing the action, accurate detection of movements during the action of the user is needed. For detecting the user's movements accurately, for example, methods such as motion capturing using an inertial measurement device and a plurality of cameras have been proposed (see Patent Literature 1).

CITATION LIST

Patent Literature

Patent Literature 1: Japanese Unexamined Patent Application Publication No. 2020-201183

SUMMARY

A wearable display device according to a first aspect includes: a controller configured to acquire, based on output values acquired from a plurality of motion sensors, a three-dimensional movement model of body movements of a person wearing the plurality of motion sensors, and generate a reproduced moving image that shows the three-dimensional movement model viewed in any direction; and a display configured to allow the wearer to visually perceive the reproduced moving image along with a surrounding scene existing on a background.

An information processing device according to a second aspect includes: a controller configured to, by using output values acquired from a plurality of motion sensors and by using a learning model, the learning model having learned a relationship between the output values of the plurality of motion sensors and body movements of a person wearing the plurality of motion sensors, estimate the body movements of the person wearing the plurality of motion sensors, and generate a three-dimensional movement model of the body movements; and a communicator configured to transmit the three-dimensional movement model to a wearable display device.

An image presentation method according to a third aspect includes: acquiring output values from a plurality of motion sensors; acquiring, based on the output values, a three-dimensional movement model of body movements of a person wearing the plurality of motion sensors; generating a reproduced moving image that shows the three-dimensional movement model viewed in any direction; and allowing the wearer to visually perceive the reproduced moving image along with a surrounding scene.

DESCRIPTION OF EMBODIMENTS

With reference to the drawings, embodiments of a wearable display device and an information processing device to which the present disclosure is applied will be described below.

Figure 1:
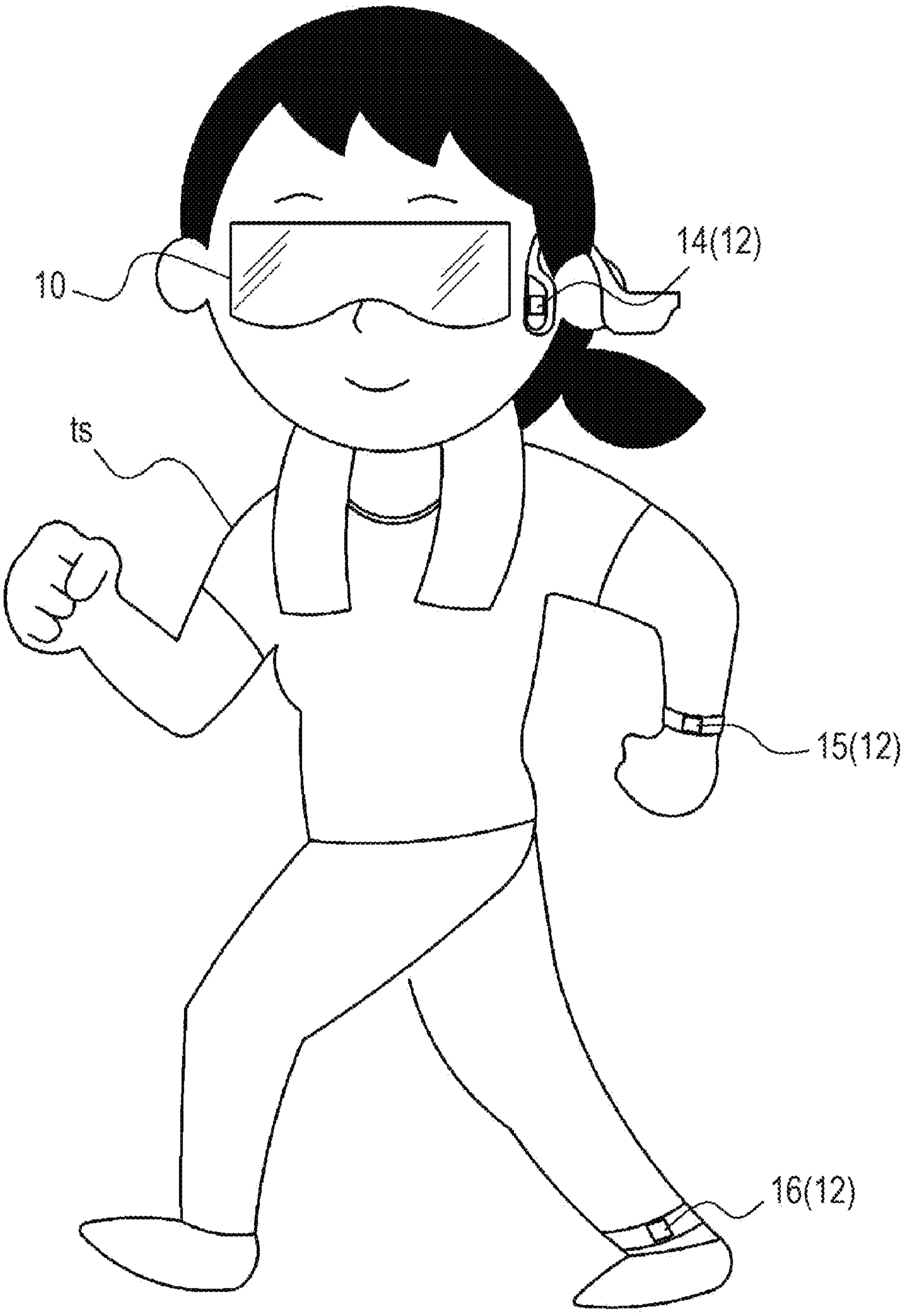
FIG. 1 is a conceptual appearance diagram illustrating a mode of specifications of a presentation system including a wearable display device and an information processing device according to a first embodiment.

As illustrated in FIG. 1, a presentation system 11 including a wearable display device 10 according to a first embodiment of the present disclosure may include a plurality of sensor devices 12 and the wearable display device 10. The presentation system 11 may further include an information processing device 13. The plurality of sensor devices 12 may be assumed to be worn by a subject (person) ts. The wearable display device 10 may be assumed to be worn on a human head. In a case where the wearer of the wearable display device 10 is the same as the subject ts, the plurality of sensor devices 12 and the wearable display device 10 may constitute the presentation system 11.

The plurality of sensor devices 12 may output values corresponding to body movements of the subject ts. The plurality of sensor devices 12 may transmit the output values as signals to the wearable display device 10 or the information processing device 13. The wearable display device 10 or the information processing device 13 may, based on the output values, generate a three-dimensional movement model of the subject ts. The wearable display device 10 allows the subject ts, the wearer, to visually perceive the generated three-dimensional movement model.

The plurality of sensor devices 12 may include at least a head sensor device 14, an arm sensor device 15, and a leg sensor device 16.

The head sensor device 14 may be assumed to be worn on the head of the subject ts. The head sensor device 14, for example, earphones or a head band, may be worn on the head in any manner of wearing. The head sensor device 14 may be configured integrally with the wearable display device 10.

The arm sensor device 15 may be assumed to be worn on the arm of the subject ts. The arm sensor device 15 may be assumed to be worn either on the left arm or on the right arm.

For example, the arm sensor device 15 may be assumed to be worn on the left arm. The arm sensor device 15 may be worn anywhere on the arm. For example, the arm sensor device 15 is worn on the wrist. The arm sensor device 15 may be worn on the arm by means of a band, a clip, or the like.

The leg sensor device 16 may be assumed to be worn on the leg of the subject ts. The leg sensor device 16 may be assumed to be worn either on the left leg or on the right leg. For example, the leg sensor device 16 may be assumed to be worn on the right leg. The leg sensor device 16 may be worn anywhere on the leg. For example, the leg sensor device 16 is worn on the ankle. The leg sensor device 16 may be worn on the arm by means of a band, a clip, or the like.

Figure 2:
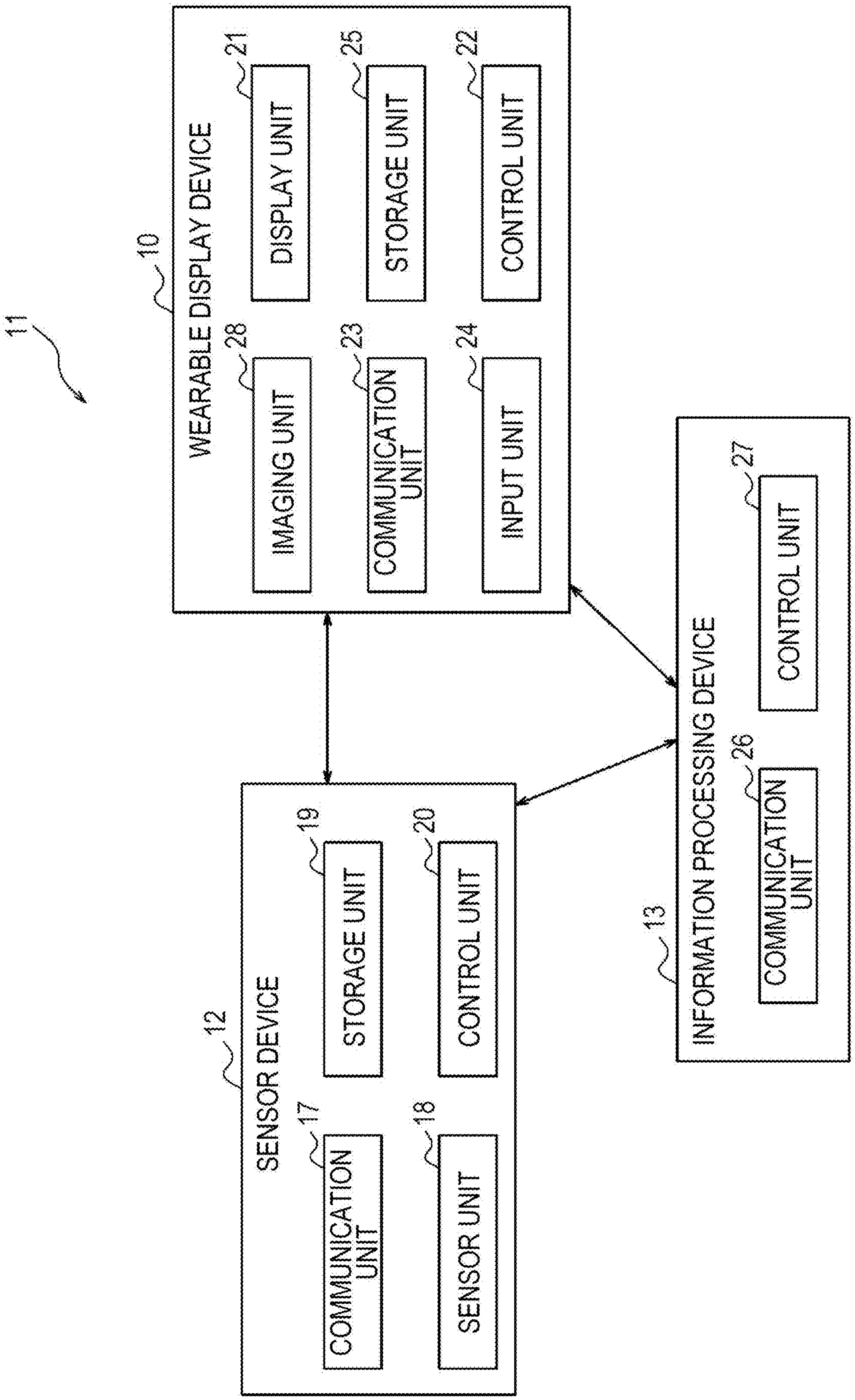
FIG. 2 is a block diagram illustrating a schematic configuration of the presentation system illustrated in FIG. 1.

As illustrated in FIG. 2, the sensor device 12 may include a communication unit 17, a sensor unit 18, a storage unit 19, and a control unit 20.

The communication unit 17 may include at least one communication module capable of communicating with the wearable display device 10 via a communication channel that includes a wired line or a wireless medium, for example. The communication unit 17 may include at least one communication module capable of communicating with the information processing device 13 via a communication channel that includes a wireless medium, for example. The communication module is a communication module that supports the standard of the communication channel. The standard of the communication channel via which communication with the wearable display device 10 can be performed is a short-range wireless communication standard including, for example, Bluetooth®, infrared, NFC (Near Field Communication), etc. The standard of the communication channel via which communication with the information processing device 13 can be performed is a mobile communication standard such as 4G (4th Generation), 5G (5th Generation), etc.

The sensor unit 18 includes at least a motion sensor. The motion sensor includes, for example, a triaxial inertial sensor. The triaxial inertial sensor includes, for example, a triaxial acceleration sensor and a triaxial gyroscopic sensor. The sensor unit 18 detects output values corresponding to the motion of the sensor device 12. When the sensor unit 18 is configured as a triaxial inertial sensor, the output values are a triaxial acceleration and a triaxial angular velocity in a local coordinate system determined individually for each sensor device 12.

The storage unit 19 may include any of a semiconductor memory, a magnetic memory, and an optical memory. The semiconductor memory is, for example, a RAM (Random Access Memory), a ROM (Read Only Memory), etc. The RAM is, for example, an SRAM (Static Random Access Memory), a DRAM (Dynamic Random Access Memory), etc. The ROM is, for example, an EEPROM (Electrically Erasable Programmable Read Only Memory), etc. The storage unit 19 may function as a primary storage device, an auxiliary storage device, or a cache memory. The storage unit 19 may store data used for operation of the sensor device 12 and data obtained through operation of the sensor device 12. The storage unit 19 stores, for example, system programs, application programs, embedded software, etc.

The control unit 20 may include at least one processor, at least one dedicated circuit, or a combination of them. The processor may be a general-purpose processor such as a CPU (Central Processing Unit) or a GPU (Graphics Processing Unit), or a special-purpose processor dedicated to specific processing. The dedicated circuit may be, for example, an FPGA (Field-Programmable Gate Array), an ASIC (Application Specific Integrated Circuit), etc. The control unit 20 may perform processing related to operation of the sensor device 12 while controlling each unit of the sensor device 12.

The control unit 20 controls the communication unit 17 to transmit, as signals, output values detected by the sensor unit 18 to the wearable display device 10 or the information processing device 13 periodically. The control unit 20, when configured to transmit the output values to the wearable display device 10, may command that the output values be transmitted using broadcasting or unicasting. The control unit 20, when configured to transmit the output values using unicasting, may determine the wearable display device 10 worn by the subject ts of the sensor device 12 as the destination of communication. For example, the control unit 20, based on reception of authentication information indicating that the own device has been authenticated as the communication partner of the wearable display device 10 on the basis of an operation input into an input unit of the wearable display device 10, may determine the wearable display device 10 as the destination of communication. The control unit 20, when configured to transmit the output values to the information processing device 13, may recognize identification information of the wearable display device 10 worn by the subject ts of the sensor device 12. The control unit 20 may, for example, transmit the identification information received together with the authentication information described above to the information processing device 13.

As illustrated in FIG. 1, the wearable display device 10 is a device configured to be worn on the head and allow the wearer to visually perceive an image just in front of the eyes of the wearer. Examples of the wearable display device 10 include AR googles, smart glasses, contact lenses, ICL (Implantable Contact Lens), and an eye patch.

As illustrated in FIG. 2, the wearable display device 10 includes a display unit 21 and a control unit 22. The wearable display device 10 may further includes a communication unit 23, an input unit 24, a storage unit 25, and an imaging unit 28.

The communication unit 23 may include at least one communication module capable of communicating with the sensor device 12 via a communication channel that includes a wired line or a wireless medium, for example. The communication unit 23 may include at least one communication module capable of communicating with the information processing device 13 via a communication channel that includes a wireless medium. The communication module is a communication module that supports the standard of the communication channel. The standard of the communication channel via which communication with the sensor device 12 can be performed is a short-range wireless communication standard including, for example, Bluetooth®, infrared, NFC, etc. The communication unit 23 may acquire the output values of the sensor unit 18 from the sensor device 12. The standard of the communication channel via which communication with the information processing device 13 can be performed is a mobile communication standard such as 4G, 5G, etc.

The input unit 24 may include at least one inputting interface configured to detect operation inputs from the user. The inputting interface is, for example, a physical key, an electrostatic capacitive key, a pointing device, a touch screen provided integrally with the display of the display unit 21, a microphone, or the like.

The display unit 21 is any display device configured to visually present augmented reality. More specifically, the display unit 21 is a display device that allows the wearer to visually perceive any image along with the scene existing on the background beyond the plane on which augmented reality is visually presented. “Any image” includes a reproduced moving image that will be described later. The display unit 21 may be a transmissive display device or a non-transmissive display device.

The transmissive display device is a display device that projects any image light while allowing the background scene to be seen therethrough. The transmissive display device may project the image light by drawing an image on the display plane. The transmissive display device may project the image light toward areas where the pupils of the wearer are presumed to be located, by using a prism and/or the like. When the display unit 21 is configured as a transmissive display device, the wearer can see the image and the scene therearound simultaneously by visually perceiving the light of the image drawn on the display plane along with the scene, with transmission through the display unit 21. The non-transmissive display device may be equipped with a camera on the back of the display plane. The non-transmissive display device is a display device that displays any image in a superposed manner on an image captured by the camera. When the display unit 21 is configured as a non-transmissive display device, a superposition of an image that is visually presented as augmented reality on an image of the scene captured by the camera, the latter of which could be seen if the display device were not worn by the wearer, is displayed on the display unit 21. As described above, the display unit 21 configured as a non-transmissive display device allows the wearer to visually perceive the surrounding scene and the image simultaneously.

The storage unit 25 may include any of a semiconductor memory, a magnetic memory, and an optical memory. The semiconductor memory is, for example, a RAM, a ROM, etc. The RAM is, for example, an SRAM, a DRAM, etc. The ROM is, for example, an EEPROM, etc. The storage unit 25 may function as a primary storage device, an auxiliary storage device, or a cache memory. The storage unit 25 may store data used for operation of the wearable display device 10 and data obtained through operation of the wearable display device 10. The storage unit 25 stores, for example, system programs, application programs, embedded software, etc.

The imaging unit 28 may be provided on the back of the display plane of the display unit 21. The imaging unit 28 may acquire an image of the surroundings around the wearer ts.

The control unit 22 may include at least one processor, at least one dedicated circuit, or a combination of them. The processor may be a general-purpose processor such as a CPU or a GPU, or a special-purpose processor dedicated to specific processing. The dedicated circuit may be, for example, an FPGA, an ASIC, etc. The control unit 22 may perform processing related to operation of the wearable display device 10 while controlling each unit of the wearable display device 10.

Based on the output values of the respective motion sensors of the plurality of sensor devices 12, the control unit 22 acquires a three-dimensional movement model of body movements of the subject ts. As will be described later, the control unit 22 may acquire the three-dimensional movement model by generating the three-dimensional movement model on the basis of the output values acquired via the communication unit 23. The control unit 22 may acquire, via the communication unit 23, the three-dimensional movement model that the information processing device 13 generates on the basis of the acquired output values. The three-dimensional movement model, examples of which include a wire-frame model, a solid model, and a surface model, is a model that represents the three-dimensional structure of the overall appearance of the subject ts who is in motion.

For the purpose of generating the three-dimensional movement model, the control unit 22 estimates the posture angle of at least any of a plurality of regions of the body of the subject ts by using an output value and a learning model. The learning model has been subjected to machine learning to output an estimate value of the posture angle of at least any of the plurality of regions of the body of the subject ts when an output value is inputted. In the first embodiment, the control unit 22 uses, as the learning model, Transformer described in “Attention is All You Need”, Authored by Ashish Vaswani, et al., Jun. 12, 2017, arXiv:1706.03762v5 (cs.CL). The Transformer is capable of processing time-series data. The learning model, however, is not limited to the Transformer. The control unit 22 may use a learning model generated through machine learning that is based on any machine learning algorithm.

The control unit 22 may estimate body-region posture angles in time series throughout the entire body of the subject ts by means of the learning model. The control unit 22 may generate the three-dimensional movement model on the basis of the body-region posture angles in time series throughout the entire body of the subject ts. The three-dimensional movement model is, for example, a model of gait movements. The control unit 22 may generate the three-dimensional movement model as an animation. The control unit 22 may generate the three-dimensional movement model by, based on the height of the subject ts, scaling a humanoid model the size of which has been determined in advance. The height of the subject ts may be detected upon an operation input to the input unit 24 and be stored into the storage unit 25.

The control unit 22 generates a reproduced moving image that shows the three-dimensional movement model viewed in any direction. The reproduced moving image may be a moving image of the three-dimensional movement model viewed from behind or sideways. The control unit 22 may determine “any direction” on the basis of, for example, an operation input to the input unit 24. When the wearable display device 10 includes a line-of-sight sensor configured to detect the line of sight of the wearer, the control unit 22 may determine the direction in which the three-dimensional movement model is viewed, in accordance with the line of sight of the wearer. For example, when the line of sight of the wearer is directed forward, the control unit 22 generates a reproduced moving image that shows the three-dimensional movement model viewed from behind in the direction of this line of sight. For example, when the line of sight of the wearer is directed sideways, the control unit 22 generates a reproduced moving image that shows the three-dimensional movement model viewed sideways in the direction of this line of sight. When the wearable display device 10 includes a motion sensor, the control unit 22 may determine the direction in which the three-dimensional movement model is viewed, in accordance with the orientation of the wearer.

The control unit 22 may determine a difference that the posture angle of each region of the body in the three-dimensional movement model has from an ideal posture angle of each region of the body in the same movements as those of the three-dimensional movement model. The control unit 22 may put a mark such as a circle indicating the region where the difference lies, in the reproduced moving image.

The control unit 22, if aware of the destination of the wearer, may generate the reproduced moving image in such a way as to give guidance on the route from the over-the-ground position where the wearable display device 10 is located to the destination. The control unit 22 may detect the over-the-ground position where the wearable display device 10 is located by using GNSS (Global Navigation Satellite System) of the wearable display device 10. The control unit 22 may recognize the destination of the wearer by, for example, reading out the destination having been acquired and stored in the storage unit 25 on the basis of an operation input to the input unit 24. The control unit 22 may generate the reproduced moving image in such a manner that, for example, at a fork in the street or the like, its visual presence can be perceived at a position along the direction of being headed for the destination.

The control unit 22, if aware of the target time of arrival at the destination, may calculate the target speed of the wearer on the basis of the distance from the over-the-ground position where the wearable display device 10 is located to the destination, the current time, and the target time of arrival. The control unit 22 may recognize the target time of arrival of the wearer by, for example, reading out the target time of arrival having been acquired and stored in the storage unit 25 on the basis of an operation input to the input unit 24.

The control unit 22, if aware of the target time of arrival at the destination, may calculate the gait speed of the three-dimensional movement model. The control unit 22 may use any method to calculate the gait speed. For example, the control unit 22 may calculate the gait speed on the basis of the output values of the head sensor device 14 and the leg sensor device 16. For example, the control unit 22 may calculate the gait speed on the basis of the cycle of the gait steps of the three-dimensional movement model and the height of the subject ts.

The control unit 22 may calculate the difference of the gait speed of the three-dimensional movement model from the target speed, or in other words, the relative speed of the target speed in relation to the gait state of the three-dimensional movement model. The control unit 22 may generate a reproduced moving image that moves in accordance with the target speed. In other words, the control unit 22 may generate the reproduced moving image in such a manner that at least one of the position of visual perception or the size in the moving image varies according to the relative speed.

The control unit 22 controls the display unit 21 to allow the wearer to visually perceive the generated reproduced moving image. For example, when a reproduced moving image that shows the three-dimensional movement model viewed from behind is to be displayed ahead along the line of sight of the wearer, the control unit 22 may control the position where the reproduced moving image is to be displayed on the display unit 21 in such a manner that the reproduced moving image looks as if it were walking on the ground lying ahead along the line of sight of the wearer. When a reproduced moving image that shows the three-dimensional movement model viewed sideways is to be displayed sideways along the line of sight of the wearer, the control unit 22 may control the position where the reproduced moving image is to be displayed on the display unit 21 in such a manner that the reproduced moving image looks as if it were walking on the ground lying sideways along the line of sight of the wearer.

The control unit 22 may perform image recognition processing on the image captured by the imaging unit 28. The control unit 22 may find the position of the ground by performing image recognition processing. The control unit 22 may control the position where the reproduced moving image is to be displayed on the display unit 21 on the basis of the found position of the ground. When the display unit 21 is configured as a transmissive display device, the control unit 22 may determine the position where the reproduced moving image is to be displayed on the display unit 21 by associating, in advance, coordinates set in the image captured by the imaging unit 28 with coordinates set in a range of being viewable by the wearer through the display unit 21. On the other hand, when the display unit 21 is configured as a non-transmissive display device, the control unit 22 may determine the position where the reproduced moving image is to be displayed on the display unit 21 by associating, in advance, coordinates set in the image captured by the imaging unit 28 with coordinates set on the display plane of the display unit 21. The control unit 22 may control the position where the reproduced moving image is to be displayed in such a manner that the sole of the foot of the three-dimensional movement model in the reproduced moving image gets grounded at the position of the ground found through image recognition processing.

The control unit 22 may control the display unit 21 in such a manner that, at a fork in the street or the like recognized through image recognition processing on the route to the destination of the wearer, the reproduced moving image looking as if it were walking on the ground is headed in the direction toward the destination.

The control unit 22 may identify a situation together with the presence of a flight of stairs or a slope in the ground lying ahead along the line of sight by performing image recognition processing. The situation is that, for example, the ground on which the wearer is walking is any of a flat ground, an upslope, and a downslope. For example, when a reproduced moving image that shows the three-dimensional movement model viewed from behind is to be displayed ahead along the line of sight of the wearer, the control unit 22 may control the position where the reproduced moving image is to be displayed, in accordance with the identified situation.

The control unit 22 may control the display unit 21 in such a manner that at least one of the position of visual perception of a reproduced moving image looking as if it were walking on the ground or the size thereof varies according to the calculated relative speed. For example, when a reproduced moving image that shows the three-dimensional movement model viewed from behind is to be displayed ahead along the line of sight of the wearer, the control unit 22 may control the position where the reproduced moving image is to be displayed in such a manner that the relative distance between the wearer and the reproduced moving image increases or decreases as the time progresses, meaning going away from the wearer or coming closer to the wearer, according to the relative speed. For example, when a reproduced moving image that shows the three-dimensional movement model viewed sideways is to be displayed sideways along the line of sight of the wearer, the control unit 22 may control the position where the reproduced moving image is to be displayed in such a manner that the relative distance between the wearer and the reproduced moving image changes as the time progresses, meaning that the position of the reproduced moving image changes to go obliquely ahead of or obliquely behind the wearer, according to the relative speed.

When the three-dimensional movement model is a model of gait movements of the subject ts, the control unit 22 may determine an ideal gait speed of the subject ts. The control unit 22 may determine the ideal gait speed depending on the subject ts.

For example, the control unit 22 may determine the ideal gait speed on the basis of an operation input detected by the input unit 24. The operation input for the ideal gait speed may be an input that directly specifies the speed. The operation input for the ideal gait speed may be an input to make a choice from among a plurality of modes having been preset as being ideal. For the plurality of gait modes, ideal gait speeds have been set. Therefore, the gait speed may be determined by selecting the gait mode that is ideal for the subject ts from among the plurality of modes.

For example, the control unit 22 may determine the ideal gait speed of the subject ts on the basis of the height of the subject ts. For the purpose of finding the ideal gait speed, the control unit 22 may read, out of the storage unit 25, a table or a calculation formula that specifies the ideal gait speed in relation to the height of the subject ts.

The control unit 22 may calculate the gait speed of the three-dimensional movement model. The control unit 22 may use any method to calculate the gait speed. For example, the control unit 22 may calculate the gait speed on the basis of the output values of the head sensor device 14 and the leg sensor device 16. For example, the control unit 22 may calculate the gait speed on the basis of the cycle of the gait steps of the three-dimensional movement model and the height of the subject ts.

The control unit 22 may calculate the difference of the gait speed of the three-dimensional movement model from the ideal gait speed, or in other words, the relative speed of the ideal gait state in relation to the gait state of the three-dimensional movement model. The control unit 22 may generate a referential moving image that moves in accordance with the relative speed. In other words, the control unit 22 may generate the referential moving image in such a manner that at least one of the position of visual perception or the size in the moving image varies according to the relative speed.

The referential moving image may be the reproduced moving image. In other words, the control unit 22 may change the position of visual perception and the size in such a manner that the relative distance between the wearer and the reproduced moving image changes as the time progresses, according to the relative speed. For example, when the relative speed is positive, the control unit 22 generates a reproduced moving image that moves away from the wearer and becomes smaller gradually at a pace corresponding to the value of the relative speed. For example, when the relative speed is negative, the control unit 22 generates a reproduced moving image that moves closer to the wearer and becomes larger gradually at a pace corresponding to the value of the relative speed. The referential moving image may be in a graphic form such as a circle different from the reproduced moving image.

The control unit 22 may control the display unit 21 to allow the wearer to visually perceive the generated referential moving image. For example, when a referential moving image that shows the three-dimensional movement model viewed from behind is to be displayed ahead along the line of sight of the wearer, the control unit 22 may control the position where the referential moving image is to be displayed on the display unit 21 in such a manner that the referential moving image looks as if it were walking on the ground lying ahead along the line of sight of the wearer. When a referential moving image that shows the three-dimensional movement model viewed sideways is to be displayed sideways along the line of sight of the wearer, the control unit 22 may control the position where the referential moving image is to be displayed on the display unit 21 in such a manner that the referential moving image looks as if it were walking on the ground lying sideways along the line of sight of the wearer.

Based on the position of the ground found by performing image recognition processing on the image captured by the imaging unit 28 described earlier, the control unit 22 may control the position where the referential moving image is to be displayed on the display unit 21. When the display unit 21 is configured as a transmissive display device, the control unit 22 may determine the position where the referential moving image is to be displayed on the display unit 21 by associating, in advance, coordinates set in the image captured by the imaging unit 28 with coordinates set in a range of being viewable by the wearer through the display unit 21. On the other hand, when the display unit 21 is configured as a non-transmissive display device, the control unit 22 may determine the position where the referential moving image is to be displayed on the display unit 21 by associating, in advance, coordinates set in the image captured by the imaging unit 28 with coordinates set on the display plane of the display unit 21. The control unit 22 may control the position where the referential moving image is to be displayed in such a manner that the sole of the foot of the three-dimensional movement model in the referential moving image gets grounded at the position of the ground found through image recognition processing.

The control unit 22 may control the display unit 21 in such a manner that, at a fork in the street or the like recognized through image recognition processing on the route to the destination of the wearer, the referential moving image looking as if it were walking on the ground is headed in the direction toward the destination.

The control unit 22 may identify a situation together with the presence of a flight of stairs or a slope in the ground lying ahead along the line of sight by performing image recognition processing. For example, when a referential moving image that shows the three-dimensional movement model viewed from behind is to be displayed ahead along the line of sight of the wearer, the control unit 22 may control the position where the referential moving image is to be displayed, in accordance with the identified situation.

The control unit 22 may control the display unit 21 in such a manner that at least one of the position of visual perception of a referential moving image looking as if it were walking on the ground or the size thereof varies according to the calculated relative speed. For example, when a referential moving image that shows the three-dimensional movement model viewed from behind is to be displayed ahead along the line of sight of the wearer, the control unit 22 may control the position where the referential moving image is to be displayed in such a manner that the relative distance between the wearer and the referential moving image increases or decreases as the time progresses, meaning going away from the wearer or coming closer to the wearer, according to the relative speed. For example, when a referential moving image that shows the three-dimensional movement model viewed sideways is to be displayed sideways along the line of sight of the wearer, the control unit 22 may control the position where the referential moving image is to be displayed in such a manner that the relative distance between the wearer and the referential moving image changes as the time progresses, meaning that the position of the referential moving image changes to go obliquely ahead of or obliquely behind the wearer, according to the relative speed.

The control unit 22 may generate a role-model moving image. The role-model moving image is a moving image that shows a role model of the same body movements as those of the reproduced moving image. The role-model moving image may be a moving image of any manner. For example, the role-model moving image may be a moving image that images, in a particular direction, a subject ts who is able to do ideal movements. For example, the role-model moving image may be a moving image that shows the three-dimensional movement model viewed in any method, similarly to the reproduced moving image. The three-dimensional movement model that is the mother of the role-model moving image may be generated on the basis of output values acquired with the sensor devices 12 worn by the subject ts who is able to do ideal movements. For example, a movement state of the subject ts who is able to do ideal movements may be acquired by performing motion capturing, and the three-dimensional movement model that is the mother of the role-model moving image may be generated on the basis of the acquired movement state. When the role-model moving image is a moving image that shows the three-dimensional movement model viewed in any direction, the control unit 22 may generate the role-model moving image in such a way as to show body movements viewed in the same direction as that of the reproduced moving image.

The control unit 22 may control the display unit 21 to allow the wearer to visually perceive the generated role-model moving image. For example, when a role-model moving image that shows the three-dimensional movement model viewed from behind is to be displayed ahead along the line of sight of the wearer, the control unit 22 may control the position where the role-model image is to be displayed on the display unit 21 in such a manner that the role-model moving image looks as if it were walking on the ground lying ahead along the line of sight of the wearer. When a role-model moving image that shows the three-dimensional movement model viewed sideways is to be displayed sideways along the line of sight of the wearer, the control unit 22 may control the position where the role-model image is to be displayed on the display unit 21 in such a manner that the role-model moving image looks as if it were walking on the ground lying sideways along the line of sight of the wearer.

Based on the position of the ground found by performing image recognition processing on the image captured by the imaging unit 28 described earlier, the control unit 22 may control the position where the role-model moving image is to be displayed on the display unit 21. When the display unit 21 is configured as a transmissive display device, the control unit 22 may determine the position where the role-model moving image is to be displayed on the display unit 21 by associating, in advance, coordinates set in the image captured by the imaging unit 28 with coordinates set in a range of being viewable by the wearer through the display unit 21. On the other hand, when the display unit 21 is configured as a non-transmissive display device, the control unit 22 may determine the position where the role-model moving image is to be displayed on the display unit 21 by associating, in advance, coordinates set in the image captured by the imaging unit 28 with coordinates set on the display plane of the display unit 21. The control unit 22 may control the position where the role-model moving image is to be displayed in such a manner that the sole of the foot of the three-dimensional movement model in the role-model moving image gets grounded at the position of the ground found through image recognition processing.

The control unit 22 may control the display unit 21 in such a manner that, at a fork in the street or the like recognized through image recognition processing on the route to the destination of the wearer, the role-model moving image looking as if it were walking on the ground is headed in the direction toward the destination.

The control unit 22 may identify a situation together with the presence of a flight of stairs or a slope in the ground lying ahead along the line of sight by performing image recognition processing. For example, when a role-model moving image that shows the three-dimensional movement model viewed from behind is to be displayed ahead along the line of sight of the wearer, the control unit 22 may control the position where the role-model moving image is to be displayed, in accordance with the identified situation.

The control unit 22 may generate information on the basis of output values acquired from the plurality of sensor devices 12. The information generated on the basis of output values includes, for example, gait speed, stride length, left and right stance time, left and right swing information, upper-body leaning-forward information, etc. The control unit 22 may perform control to display either the output values acquired from the plurality of sensor devices 12 or information generated on the basis of the output values, or both, on the display unit 21. The control unit 22 may, based on an input to the input unit 24, determine whether or not to display either the output values acquired from the plurality of sensor devices 12 or information generated on the basis of the output values, or both, on the display unit 21.

The information processing device 13 includes a communication unit 26 and a control unit 27.

The communication unit 26 may include at least one communication module capable of communicating with the wearable display device 10 and the sensor device 12 via a communication channel that includes a wireless medium, for example. The communication module is a communication module that supports the standard of the communication channel. The standard of the communication channel via which communication with the wearable display device 10 and the sensor device 12 can be performed is a mobile communication standard such as 4G, 5G, etc.

The control unit 27 may include at least one processor, at least one dedicated circuit, or a combination of them. The processor may be a general-purpose processor such as a CPU or a GPU, or a special-purpose processor dedicated to specific processing. The dedicated circuit may be, for example, an FPGA, an ASIC, etc. The control unit 27 may perform processing related to operation of the information processing device 13 while controlling each unit of the information processing device 13.

Based on the output values of the respective motion sensors of the plurality of sensor devices 12, the control unit 27 may generate a three-dimensional movement model of body movements of the subject ts. The control unit 27 may generate the three-dimensional movement model on the basis of the output values by using the same method as that of the control unit 22 of the wearable display device 10. That is, the control unit 27 generates the three-dimensional movement model of the body movements by estimating the body movements of the subject ts who wears the sensor devices 12 by using the output values and the learning model. The control unit 27 controls the communication unit 26 to transmit the three-dimensional movement model together with the output values to the wearable display device 10 corresponding to the received identification information.

Figure 3:
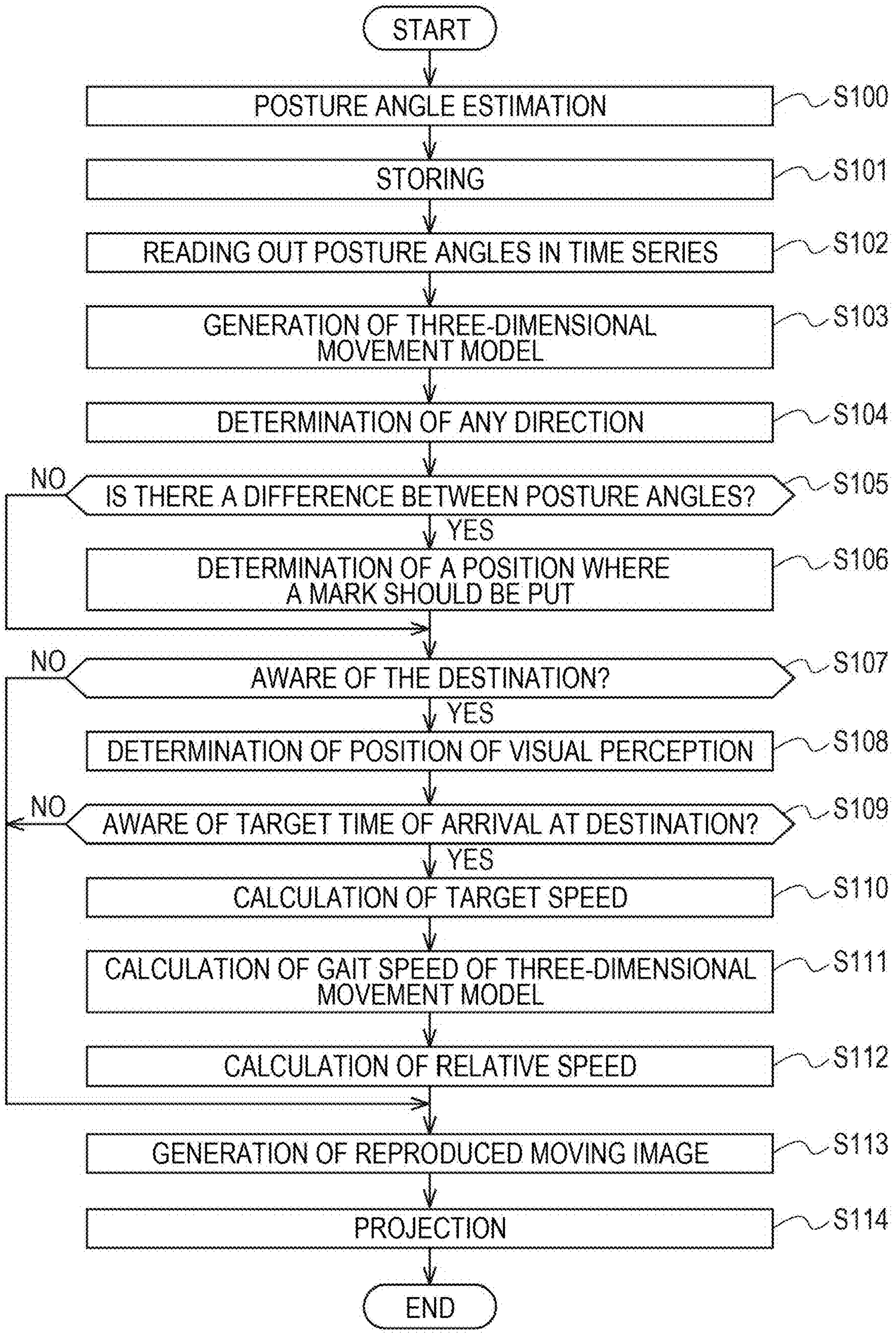
FIG. 3 is a flowchart for explaining first image presentation processing performed by a control unit of the wearable display device illustrated in FIG. 2.

With reference to the flowchart of FIG. 3, first image presentation processing performed by the control unit 22 of the wearable display device 10 in the first embodiment will now be described. The first image presentation processing is initiated each time an output value is acquired from the sensor device 12, for example.

In step S100, based on output values acquired from the plurality of sensor devices 12, the control unit 22 estimates body-region posture angles throughout the entire body of the subject ts. After the estimation, the process proceeds to step S101.

In step S101, the control unit 22 stores each posture angle having been estimated in step S100 into the storage unit 25 in association with time. After the storing, the process proceeds to step S102.

In step S102, the control unit 22 reads, out of the storage unit 25, the posture angle associated with each time in time series in a reverse time-series order, going backward in time from the most recent one. After the reading, the process proceeds to step S103.

In step S103, the control unit 22 generates a three-dimensional movement model of the subject ts on the basis of the time-series posture angles having been read in step S102. After the generation, the process proceeds to step S104.

In step S104, the control unit 22 determines any direction in which the three-dimensional movement model having been generated in step S103 is to be viewed. After the determination, the process proceeds to step S105.

In step S105, the control unit 22 determines whether or not there is a difference between the posture angle of each region of the body in the three-dimensional movement model having been generated in step S103 and an ideal posture angle of each region of the body in the same movements as those of the three-dimensional movement model having been generated in step S103. If the difference exists, the process proceeds to step S106. If the difference does not exist, the process proceeds to step S107.

In step S106, the control unit 22 determines the region(s) of the body having been determined in step S105 as having the difference, or in other words, the position(s) where a mark(s) should be put in the reproduced moving image. After the determination, the process proceeds to step S107.

In step S107, the control unit 22 determines whether or not it is aware of the destination of the wearer. If aware, the process proceeds to step S108. If not aware, the process proceeds to step S113.

In step S108, based on the over-the-ground position where the wearable display device 10 is located, and the destination, the control unit 22 determines the position of visual perception of the reproduced moving image. After the determination, the process proceeds to step S109.

In step S109, the control unit 22 determines whether or not it is aware of the target time of arrival at the destination having been subjected to the aware-or-unaware determination in step S107. If aware, the process proceeds to step S110. If not aware, the process proceeds to step S113.

In step S110, the control unit 22 calculates the target speed on the basis of the distance from the over-the-ground position where the wearable display device 10 is located to the destination, the current time, and the target time of arrival having been subjected to the aware-or-unaware determination in step S109. After the calculation, the process proceeds to step S111.

In step S111, the control unit 22 calculates the gait speed of the three-dimensional movement model having been generated in step S103. After the calculation, the process proceeds to step S112.

In step S112, the control unit 22 calculates the relative speed of the target speed having been calculated in step S110 in relation to the gait speed of the three-dimensional movement model having been calculated in step S111. After the calculation, the process proceeds to step S113.

In step S113, the control unit 22 generates a reproduced moving image on the basis of at least the three-dimensional movement model having been generated in step S103 and any direction having been determined in step S104. In a case where the marking position has been determined in step S106, the control unit 22 puts a mark at the marking position on the generated reproduced moving image. In a case where the position of visual perception has been determined in step S108, the control unit 22 sets, as the position of visual perception, the position where the reproduced moving image is to be visually perceived. In a case where the relative speed has been calculated in step S112, the control unit 22 sets the position of visual perception of the reproduced moving image according to the time-progress change of the reproduced moving image in such a way as to vary according to the relative speed. After the generation, the process proceeds to step S114.

In step S114, the control unit 22 controls the display unit 21 to project the reproduced moving image having been generated in step S113 from the display unit 21. After the projection, the first image presentation processing ends.

Figure 4:
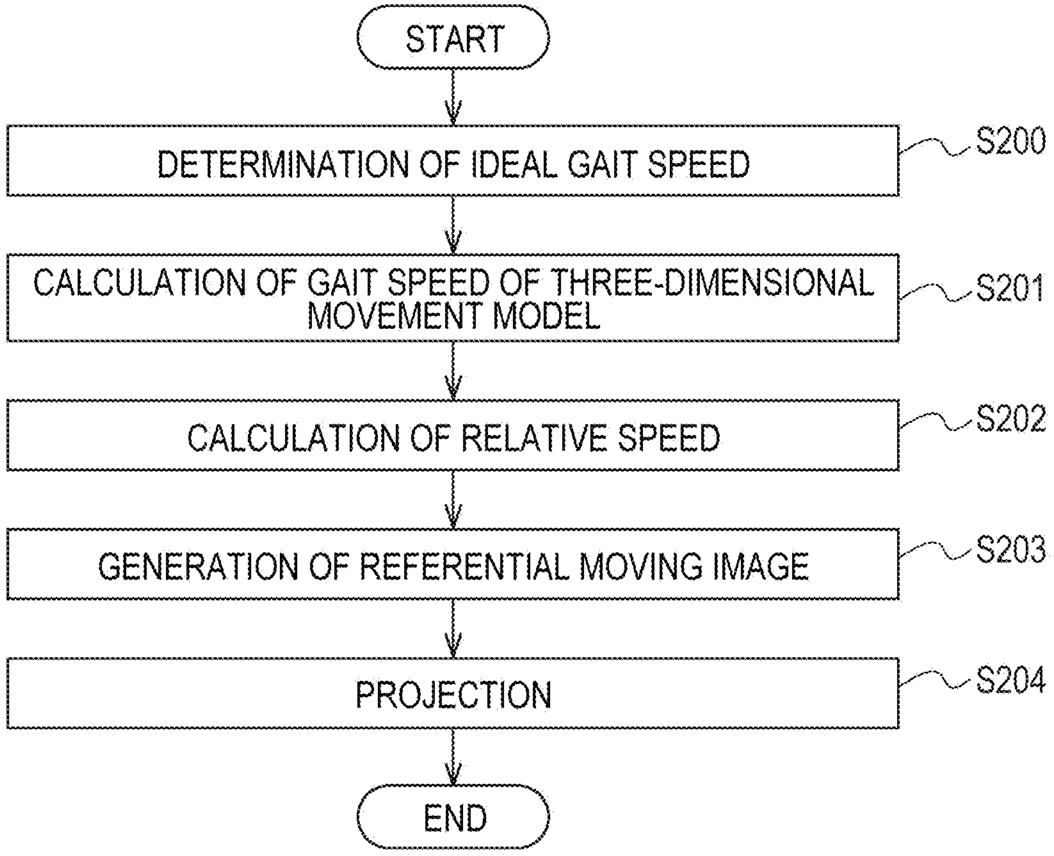
FIG. 4 is a flowchart for explaining second image presentation processing performed by the control unit of the wearable display device illustrated in FIG. 2.

With reference to the flowchart of FIG. 4, second image presentation processing performed by the control unit 22 of the wearable display device 10 in the first embodiment will now be described. The second image presentation processing is initiated each time an output value is acquired from the sensor device 12, for example.

In step S200, the control unit 22 determines an ideal gait speed depending on the subject ts. After the determination, the process proceeds to step S201.

In step S201, the control unit 22 calculates the gait speed of the three-dimensional movement model having been generated in step S103 of the first image presentation processing on a latest basis. After the calculation, the process proceeds to step S202.

In step S202, the control unit 22 calculates the relative speed of the ideal gait speed having been calculated in step S200 in relation to the gait speed of the three-dimensional movement model having been calculated in step S201. After the calculation, the process proceeds to step S203.

In step S203, the control unit 22 generates a referential moving image that looks as if it were moving at the relative speed having been calculated in step S202. After the generation, the process proceeds to step S204.

In step S204, the control unit 22 controls the display unit 21 to project the referential moving image having been generated in step S203 from the display unit 21. After the projection, the second image presentation processing ends.

The wearable display device 10 according to the first embodiment having the configuration described above acquires, based on output values acquired from a plurality of motion sensors, a three-dimensional movement model of body movements of the subject ts, generates a reproduced moving image that shows the three-dimensional movement model viewed in any direction, and allows the wearer to visually perceive the reproduced moving image along with a scene existing on a background. With this configuration, the wearable display device 10 can allow the wearer who is the same person as the subject ts to observe the body movements of the subject ts on a real-time basis. Therefore, the wearable display device 10 enables real-time visual perception of the body movements of the subject ts and thus contributes to an improvement in the body movements of the subject ts. In addition, the wearable display device 10, with the above configuration, enables the reproduced moving image to be viewed along with the surrounding scene and thus can reduce the risk of low attention to the surroundings, for example, when using a smartphone and focusing solely on the screen. As described above, the wearable display device 10 enables the detected movements to be recognized appropriately.

The wearable display device 10 according to the first embodiment generates a referential moving image that moves according to a difference between an ideal gait speed and a gait speed of the three-dimensional movement model, and allows the wearer to visually perceive the referential moving image. With this configuration, the wearable display device 10 can allow the wearer to recognize an appropriate gait speed. Therefore, the wearable display device 10 can encourage the wearer to walk at an appropriate gait speed.

In the wearable display device 10 according to the first embodiment, the referential moving image is the reproduced moving image. With this configuration, the wearable display device 10 can reduce the possibility of distraction of attention because a single focus of viewing suffices for perceiving the gait speed and the body movements, as compared with a configuration in which the referential moving image and the reproduced moving image are displayed separately.

A wearable display device according to a second embodiment of the present disclosure will now be described. The second embodiment is different from the first embodiment in that a person who wears a plurality of sensor devices and a person who wears a wearable display device are not identical to each other. The second embodiment will be described below with a focus on the point of difference from the first embodiment. The same reference signs will be assigned to those having the same configuration as that of the first embodiment.

Figure 5:
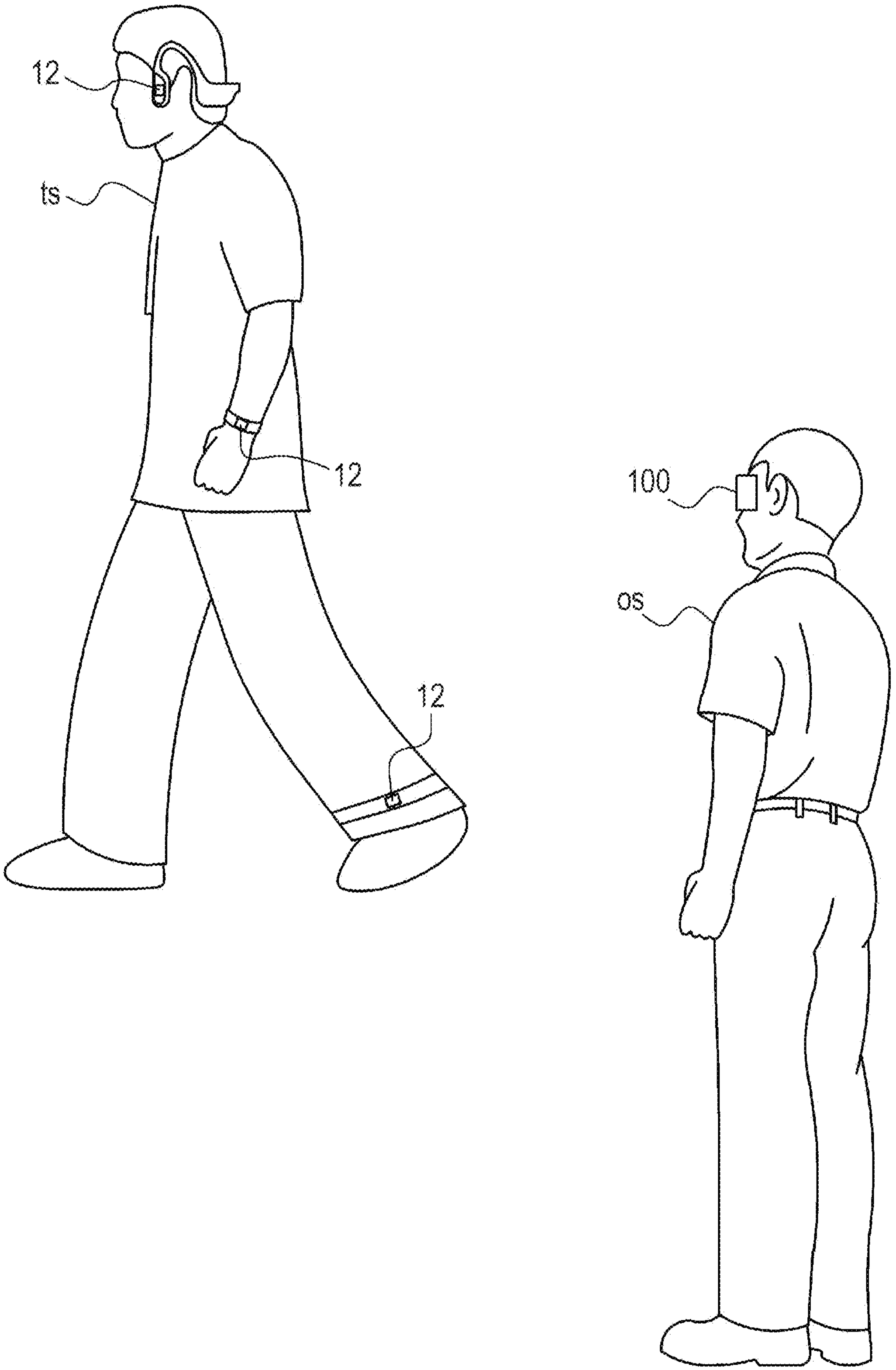
FIG. 5 is a conceptual appearance diagram illustrating a mode of specifications of a wearable display device and sensor devices according to a second embodiment.

As illustrated in FIG. 5, in the second embodiment, the plurality of sensor devices 12 may be assumed to be worn by a subject (person) ts, similarly to the first embodiment. In the first embodiment, unlike the first embodiment, a wearable display device 100 may be assumed to be worn on the head of an observer os who is different from the subject. In the second embodiment, the configuration and function of the sensor device 12 are the same as those of the first embodiment. The subject ts is, for example, a patient, or a person who is to be helped. The observer os is, for example, a doctor, a nurse, or a helper.

Figure 6:
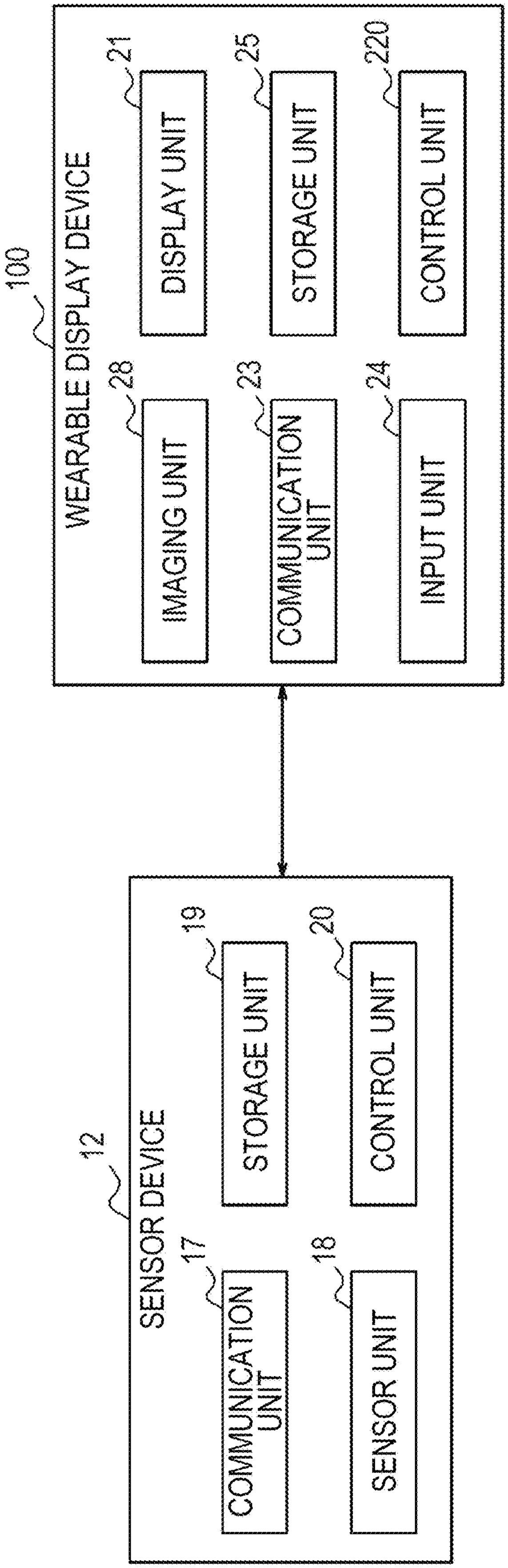
FIG. 6 is a block diagram illustrating a schematic configuration of the wearable display device and a sensor device illustrated in FIG. 5.

In the second embodiment, as illustrated in FIG. 6, the wearable display device 100 may include the display unit 21, the communication unit 23, the input unit 24, the storage unit 25, the imaging unit 28, and a control unit 220, similarly to the first embodiment. The configuration and function of the display unit 21, the communication unit 23, the input unit 24, the storage unit 25, and the imaging unit 28 according to the second embodiment are the same as those of the first embodiment. In the second embodiment, the control unit 220 may be additionally capable of performing processing different from that of the control unit 22 according to the first embodiment.

In the second embodiment, based on the output values of the respective motion sensors of the plurality of sensor devices 12, the control unit 220 acquires a three-dimensional movement model of body movements of the subject ts, similarly to the first embodiment. In the second embodiment, the control unit 220 may generate a reproduced moving image that shows a three-dimensional movement model viewed in any direction, similarly to the first embodiment.

In the second embodiment, unlike the first embodiment, the control unit 220 may have a subject observation mode as a mode of operation. The switching of the mode of operation may be performed by making an operation input to the input unit. In the subject observation mode, the control unit 220 may control the display unit 21 to display the reproduced moving image on the basis of the image acquired by the imaging unit 28.

Specifically, when the entire body of a person is included as a partial image in the image acquired by the imaging unit 28, the control unit 220 may generate, as the reproduced moving image, a three-dimensional movement model viewed in a direction different from the orientation of the entire body included as the partial image in this captured image. The three-dimensional movement model viewed in the different direction may represent the entire body or a part of the body.

The control unit 220 may use multiclass classification with an SVM (Support Vector Machine) and a semi-supervised learning discrimination model for determining the orientation of the entire body in the image. The control unit 220 may set discrimination with an orientation different from the orientation of the entire body on the basis of a predetermined rule. For example, when the orientation of the entire body goes forward of the subject ts, a sideway direction of the subject ts may be set as the direction of the line of sight for creating the three-dimensional movement model. For example, when the orientation of the entire body goes sideways of the subject ts, the forward direction of the subject ts may be set as the direction of the line of sight for creating the three-dimensional movement model.

Alternatively, the line of sight for creating the three-dimensional movement model may be set by the gesture or voice of the observer who wears the wearable display device 100. The control unit 220 may control the display unit 21 to display the generated reproduced moving image.

The control unit 220 may determine whether to display the entire body or to display a part of the body on the basis of an operation input detected by the input unit 24. The control unit 220 may determine which part of the body should be displayed on the basis of a predetermined rule.

Or specifically, when a part of the body of a person is included as a partial image in the image acquired by the imaging unit 28, the control unit 220 may generate, as the reproduced moving image, a three-dimensional movement model of the entire body viewed in any direction. The control unit 220 may control the display unit 21 to display the generated reproduced moving image. "Any direction" may be set by the gesture or voice of the observer who wears the wearable display device 100 or set on the basis of a predetermined rule.

Figure 7:
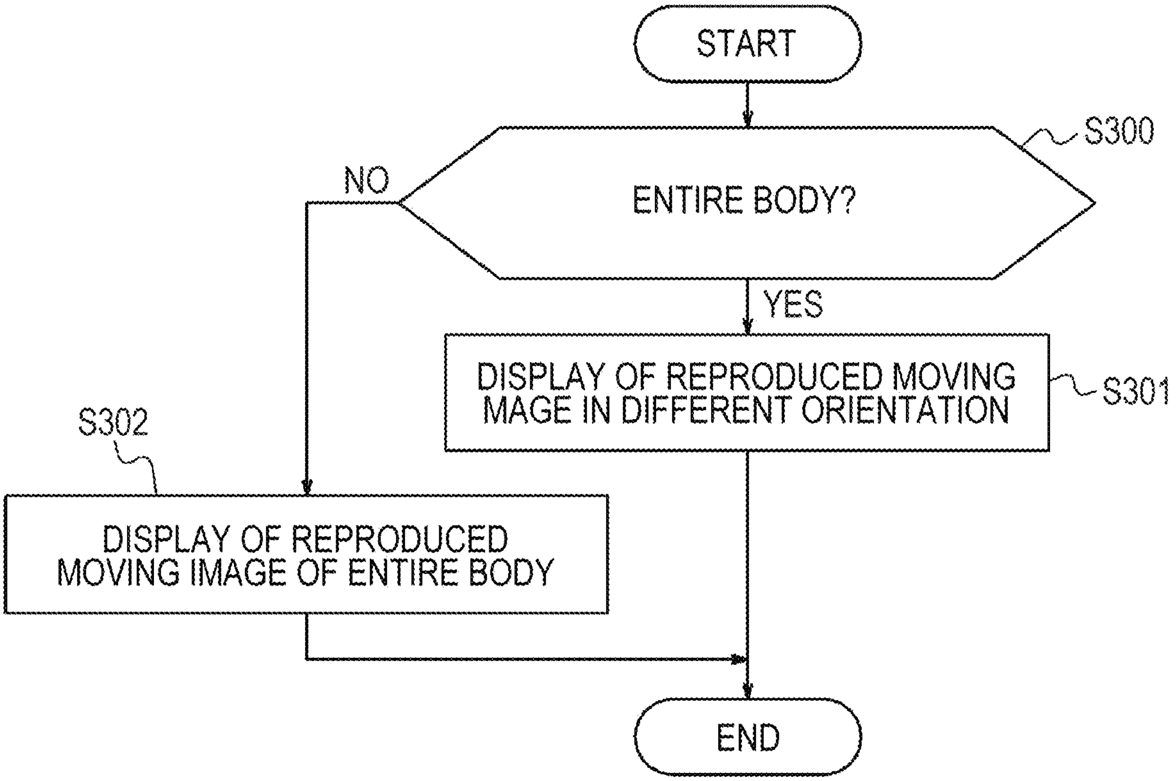
FIG. 7 is a flowchart for explaining third image presentation processing performed by a control unit of the wearable display device illustrated in FIG. 6.

With reference to the flowchart of FIG. 7, third image presentation processing performed by the control unit 220 of the wearable display device 100 in the second embodiment will now be described. The third image presentation processing is initiated each time an image is acquired from the imaging unit 28, for example.

In step S300, the control unit 220 determines whether or not the entire body is included in the image acquired from the imaging unit 28. If the entire body is included, the process proceeds to step S301. If neither the body itself nor the entire body is included, the process proceeds to step S302.

In step S301, the control unit 220 determines the orientation of the entire body included in the image. The control unit 220 generates, as the reproduced moving image, a three-dimensional movement model viewed in a direction different from the determined orientation. The control unit 220 controls the display unit 21 to display the reproduced moving image. After the displaying of the reproduced moving image, the third image presentation processing ends.

In step S302, the control unit 220 generates, as the reproduced moving image, a three-dimensional movement model of the entire body viewed in any direction. The control unit 220 controls the display unit 21 to display the reproduced moving image. After the displaying of the reproduced moving image, the third image presentation processing ends.

The wearable display device 100 according to the second embodiment having the configuration described above also acquires, based on output values acquired from a plurality of motion sensors, a three-dimensional movement model of body movements of the subject ts, generates a reproduced moving image that shows the three-dimensional movement model viewed in any direction, and allows the wearer to visually perceive the reproduced moving image along with a scene existing on a background. For example, viewing the posture and/or movements of a patient, a person who needs help, and the like not only from ahead or from behind but also from the left or from the right is demanded by healthcare professionals such as doctors and helpers. Addressing such a demand, the wearable display device 100 having the configuration described above can allow the wearer os who is different from the subject ts to observe the body movements of the subject ts on a real-time basis. Therefore, the wearable display device 100 can allow the wearer os to view, with a different field of view, the subject ts who views directly.

The wearable display device 100 according to the second embodiment further includes the imaging unit 28 configured to acquire an image of the surroundings around the wearer os, and the display unit 21 displays the reproduced moving image on the basis of the image acquired by the imaging unit 28. With this configuration, the wearable display device 100 displays the reproduced moving image on the basis of the direct field of view of the wearer os and thus enables recognizing the orientation of the subject ts automatically without an operation input by the wearer os.

In the wearable display device 100 according to the second embodiment, when the image acquired by the imaging unit 28 includes an entire person body, the display unit 21 displays, as the reproduced moving image, a three-dimensional movement model viewed in a direction different from the orientation of the body included in the image. With this configuration, the wearable display device 100 can allow the wearer os to view the subject ts simultaneously, with a different field of view from that of a scene that the wearer os can view directly.

In the wearable display device 100 according to the second embodiment, when the image acquired by the imaging unit 28 includes a partial person body, the display unit 21 displays, as the reproduced moving image, a three-dimensional movement model of the entire body viewed in any direction. With this configuration, the wearable display device 100 can allow the wearer os to view the entire body of the subject ts in a situation where the wearer os cannot directly view, except for a part of, the subject ts due to being close to the subject ts.

In an embodiment, (1) a wearable display device includes:

a controller configured to acquire, based on output values acquired from a plurality of motion sensors, a three-dimensional movement model of body movements of a person wearing the plurality of motion sensors, and generate a reproduced moving image that shows the three-dimensional movement model viewed in any direction; and a display configured to allow the wearer to visually perceive the reproduced moving image along with a surrounding scene.

(2) In the wearable display device according to (1) stated above, the reproduced moving image is a moving image of the three-dimensional movement model viewed from behind or sideways.

(3) The wearable display device according to (2) stated above further includes:

an imager configured to acquire an image of surroundings around the wearer, wherein the controller is configured to identify a situation of ground from the image of the surroundings acquired by the imager, and, based on the identified situation of the ground, control display of the reproduced moving image to make a sole of a foot of the three-dimensional movement model grounded.

(4) In the wearable display device according to (3) stated above, the controller is configured to identify, as the situation of the ground, whether the ground is flat, sloping up, or sloping down.

(5) In the wearable display device according to any of (1) to (4) stated above, when the three-dimensional movement model is a model of gait movements of the person, the controller is configured to generate a referential moving image that moves according to a difference between an ideal gait speed and a gait speed of the three-dimensional movement model; and the display is configured to allow the wearer to visually perceive the referential moving image.

(6) In the wearable display device according to (5) stated above, the referential moving image is the reproduced moving image.

(7) In the wearable display device according to (5) or (6) stated above, the controller is configured to determine the ideal gait speed depending on the person.

(8) In the wearable display device according to any of (1) to (7) stated above, the controller is configured to generate a role-model moving image that shows a role model of same body movements as those of the reproduced moving image, and the display is configured to allow the wearer to visually perceive the role-model moving image.

(9) In the wearable display device according to (8) stated above, the role-model moving image shows body movements viewed in a same direction as that of the reproduced moving image.

(10) The wearable display device according to (1) stated above further includes:

an imager configured to acquire an image of surroundings around the wearer, wherein the display is configured to display the reproduced moving image on a basis of the image acquired by the imager.

(11) In the wearable display device according to (10) stated above, the display is configured to, when the image acquired by the imager includes an entire person body, display, as the reproduced moving image, the three-dimensional movement model viewed in a direction different from an orientation of the body included in the image.

(12) In the wearable display device according to (10) or (11) stated above, the display is configured to, when the image acquired by the imager includes a partial person body, display, as the reproduced moving image, the three-dimensional movement model of an entire body viewed in any direction.

(13) In the wearable display device according to any of (1) to (12) stated above, the display is configured to display either the output values acquired from the plurality of motion sensors or information generated on a basis of the output values, or both.

(14) In the wearable display device according to (13) stated above, the information generated on the basis of the output values includes gait speed, stride length, left and right stance time, left and right swing information, upper-body leaning-forward information.

(15) An information processing device includes:

a controller configured to, by using output values acquired from a plurality of motion sensors and by using a learning model, the learning model having learned a relationship between the output values of the plurality of motion sensors and body movements of a person wearing the plurality of motion sensors, estimate the body movements of the person wearing the plurality of motion sensors, and generate a three-dimensional movement model of the body movements; and a communicator configured to transmit the three-dimensional movement model to a wearable display device.

(16) An image presentation method includes:

acquiring output values from a plurality of motion sensors;

acquiring, based on the output values, a three-dimensional movement model of body movements of a person wearing the plurality of motion sensors;

generating a reproduced moving image that shows the three-dimensional movement model viewed in any direction; and allowing the wearer to visually perceive the reproduced moving image along with a surrounding scene.

Though the wearable display device 10 and the information processing device 13 according to some embodiments have been described above, the present disclosure may be embodied in forms of, besides a method or a program for implementing the device, a storage medium (for example, an optical disc, a magneto-optical disk, a CD-ROM, a CD-R, a CD-RW, a magnetic tape, a hard disk, or a memory card) storing the program.

The implementation form of the program is not limited to an application program such as an object code compiled by a compiler or a program code executed by an interpreter, and may be a form of a program module incorporated in an operating system. The program may be configured to perform, or configured not to perform, all processing only in a CPU on a control board. The program may be configured such that a part or the entirety of the program is executed by another processing unit mounted on an expansion board or an expansion unit added to a board as necessary.

The drawings for explaining the embodiments of the present disclosure are schematic. The drawings are not necessarily drawn to scale, etc.

While some embodiments of the present disclosure have been described on the basis of various drawings and examples, it is to be noted that a person skilled in the art can make various variations or changes on the basis of the present disclosure. Therefore, it is to be noted that these variations or changes are within the scope of the present disclosure. For example, a function and the like included in each component and the like can be reconfigured in such a way as not to cause any logical contradiction, and a plurality of components and the like can be combined into one or be divided.

All of the configuration elements described/illustrated in the present disclosure and/or all of the methods or all of the steps of processing disclosed herein can be combined in any combination except for cases where they are mutually exclusive. Each of the features described/illustrated in the present disclosure can be replaced with an alternative feature fulfilling an identical purpose, an equivalent purpose, or a similar purpose, unless explicitly denied. Thus, unless explicitly denied, each of the disclosed features is just one example of a comprehensive series of identical or equivalent features.

Furthermore, embodiments according to the present disclosure shall not be construed to be limited to any of the specific configurations of the foregoing embodiments. Embodiments according to the present disclosure can be expanded to all novel features described/illustrated in the present disclosure, or any combination thereof, or all novel methods described/illustrated herein, or processing steps, or any combination thereof.

Terms "first" and "second" and the like used in the present disclosure are identifiers for distinguishing the configuration elements, etc. from each other. Those distinguished from each other by "first" and "second" in the present disclosure can be interchanged in terms of their ordinal numbers. For example, the identifiers "first" and "second" of the first image presentation processing and the second image presentation processing are interchangeable. The interchanging of the identifiers is performed simultaneously. Those distinguished from each other before the interchanging are distinguishable also after it. The identifiers may be deleted. Those without the identifiers are distinguished from each other by their reference signs. The identifiers such as "first" and "second" in the present disclosure shall not be relied upon alone as a sole basis for interpreting the sequential order of them or the existence of an identifier with a smaller number.

REFERENCE SIGNS

10, 100 wearable display device
11 presentation system
12 sensor device
13 information processing device
14 head sensor device
15 arm sensor device
16 leg sensor device
17 communication unit
18 sensor unit

19 storage unit
20 control unit
21 display unit
22, 220 control unit
23 communication unit
24 input unit
25 storage unit
26 communication unit
27 control unit
28 imaging unit
os observer
ts subject

The invention claimed is:

1. A wearable display device comprising:

a controller configured to acquire, based on output values acquired from a plurality of motion sensors, a three-dimensional movement model of body movements of a person wearing the plurality of motion sensors, and generate a reproduced moving image that shows the three-dimensional movement model viewed from behind or sideways; and a display configured to allow the wearer to visually perceive the reproduced moving image along with a surrounding scene.

2. The wearable display device according to claim 1, further comprising:

an imager configured to acquire an image of surroundings around the wearer, wherein the controller is configured to identify a situation of ground from the image of the surroundings acquired by the imager, and, based on the identified situation of the ground, control display of the reproduced moving image to make a sole of a foot of the three-dimensional movement model grounded.

3. The wearable display device according to claim 2, wherein the controller is configured to identify, as the situation of the ground, whether the ground is flat, sloping up, or sloping down.

4. The wearable display device according to claim 1, wherein when the three-dimensional movement model is a model of gait movements of the person, the controller is configured to generate a referential moving image that moves according to a difference between an ideal gait speed and a gait speed of the three-dimensional movement model; and the display is configured to allow the wearer to visually perceive the referential moving image.

5. The wearable display device according to claim 4, wherein the referential moving image is the reproduced moving image.

6. The wearable display device according to claim 4, wherein the controller is configured to determine the ideal gait speed depending on the person.

7. The wearable display device according to claim 1, wherein the controller is configured to generate a role-model moving image that shows a role model of same body movements as those of the reproduced moving image, and the display is configured to allow the wearer to visually perceive the role-model moving image.

8. The wearable display device according to claim 7, wherein the role-model moving image shows body movements viewed in a same direction as that of the reproduced moving image.

9. The wearable display device according to claim 1, further comprising:

an imager configured to acquire an image of surroundings around the wearer, wherein the display is configured to display the reproduced moving image on a basis of the image acquired by the imager.

10. The wearable display device according to claim 9, wherein the display is configured to, when the image acquired by the imager includes an entire person body, display, as the reproduced moving image, the three-dimensional movement model viewed from behind or sideways.

11. The wearable display device according to claim 9, wherein the display is configured to, when the image acquired by the imager includes a partial person body, display, as the reproduced moving image, the three-dimensional movement model of an entire body viewed from behind or sideways.

12. The wearable display device according to claim 1, wherein the display is configured to display either the output values acquired from the plurality of motion sensors or information generated on a basis of the output values, or both.

13. The wearable display device according to claim 12, wherein the information generated on the basis of the output values includes gait speed, stride length, left and right stance time, left and right swing information, upper-body leaning-forward information.

14. An information processing device comprising:

a controller configured to, by using output values acquired from a plurality of motion sensors and by using a learning model, the learning model having learned a relationship between the output values of the plurality of motion sensors and body movements of a person wearing the plurality of motion sensors, estimate the body movements of the person wearing the plurality of motion sensors, and generate a three-dimensional movement model of the body movement viewed from behind or sideways; and a communicator configured to transmit the three-dimensional movement model to a wearable display device.

15. An image presentation method comprising:

acquiring output values from a plurality of motion sensors;

acquiring, based on the output values, a three-dimensional movement model of body movements of a person wearing the plurality of motion sensors;

generating a reproduced moving image that shows the three-dimensional movement model viewed from behind or sideways; and allowing the wearer to visually perceive the reproduced moving image along with a surrounding scene.

* * * * *